(12) United States Patent
Hubert et al.

(10) Patent No.: US 6,435,039 B1
(45) Date of Patent: Aug. 20, 2002

(54) METHOD AND DEVICE FOR CONTINUOUS GRAVIMETRIC ASSAYING

(75) Inventors: Wolfschaffner Hubert, Dasing; Wagner Hubert, Aystetten; Häfner Hans Wilhelm, Aichach-Walchshofen, all of (DE)

(73) Assignee: Pfister GmbH, Augsburg (DE)

( * ) Notice: Subject to any disclaimer, the term of this patent is extended or adjusted under 35 U.S.C. 154(b) by 0 days.

(21) Appl. No.: 09/508,235
(22) PCT Filed: Sep. 10, 1998
(86) PCT No.: PCT/EP98/05784
§ 371 (c)(1), (2), (4) Date: Mar. 7, 2000
(87) PCT Pub. No.: WO99/13302
PCT Pub. Date: Mar. 18, 1999

(30) Foreign Application Priority Data

Sep. 10, 1997 (DE) .......................................... 197 39 712

(51) Int. Cl.$^7$ ................................................. G01F 1/78
(52) U.S. Cl. ................................................. 73/861.351
(58) Field of Search ........................ 73/861.71, 861.72, 73/861.73, 861.74, 861.75, 861.77, 861.351, 861.352, 861.353, 217, 218

(56) References Cited

U.S. PATENT DOCUMENTS

| 4,221,507 A | * | 9/1980 | Olney ........................... 406/33 |
| 4,528,848 A | * | 7/1985 | Hafner .......................... 73/218 |
| 5,125,535 A | * | 6/1992 | Ohlman ......................... 222/77 |
| 5,494,520 A | * | 2/1996 | Lamendola et al. ......... 118/608 |
| 6,041,664 A | * | 3/2000 | Hafner .................. 73/861.353 |

\* cited by examiner

*Primary Examiner*—Max Noori
(74) *Attorney, Agent, or Firm*—Knobbe Martens Olson & Bear LLP

(57) ABSTRACT

An apparatus for continuous, gravimetric metering and mass flow determination of flowable materials includes a metering device that is configured to determine instantaneous mass flow at an anticipatory control point ahead of a delivery point at which flowable material is discharged. The discharge of the flowable material is controllable by altering a speed of rotation of the metering device. A metering controller is connected to the metering device and configured to detect an actual speed of rotation. Discharge at the delivery point is regulated in dependence on mass flow deviations at the metering device by variable location of the anticipatory control point.

11 Claims, 2 Drawing Sheets

METHOD AND DEVICE FOR CONTINUOUS GRAVIMETRIC ASSAYING

FIELD OF THE INVENTION

This invention relates to a method and an apparatus for continuous, gravimetric metering and mass flow determination of flowable materials, with a metering device, especially a metering rotor with determination of the instantaneous mass flow.

BACKGROUND OF THE INVENTION

Such a system for continuous gravimetric supply and/or metering of bulk goods is known from DE 4 023 948 A1, wherein a metering rotor balance according to DE 3 217 406 A1 or EP A 0 198 956 is utilised. The metering device following a bulk goods feeder is arranged in a closed pneumatic conveyor path and a collector device with a cell wheel lock supported on load cells is connected afterwards. A computer-controlled, central metering system is used for the appropriate regulation of the desired feed amount per unit time (feed strength), such as is described in DE 3 217 406 A1, wherein the weighing signal of the hopper weighing cells serves as an input signal and the speed of the metering rotor and optionally the cell wheel lock for the bulk goods feed are regulated. However there is some regulation dead time until adjustment up to the set-point feed strength.

This regulating system is described in more detail in the above-cited EP A 0 198 956, wherein the bulk goods mass acting instantaneously in the rotor weighing path in the metering rotor balance is detected in the metering rotor balance, from which the bulk goods mass throughput is obtained by multiplication with the angular velocity of the metering rotor. The weighing electronics delay passing on the current weight value of the bulk goods mass (loading) present at the moment on the rotor weighing path (measuring path) up to a particular transfer point, so that the rotor angular velocity can be varied shortly before the discharge of the bulk material to the pneumatic conveyor line in accordance with the predetermined set-point conveyor strength, i.e. the metering rotor is accelerated or delayed. A relatively high metering accuracy results, which has generally proved itself in metering powdered bulk goods, for example in coal dust metering in rotary cement kilns or for metering additives in flue gas purification.

With certain bulk goods however, such as additives for admixture in flue gas purification from power plants, it has to be recognised that these bulk goods can tend to "shooting" or formation of bridges, depending on the degree of moisture, fluidisation, fineness and the like, so that random or strongly pulsating bulk flow fluctuations (loading differences) can occur in the bulk goods feed. In this case the previously described metering device can hardly compensate for the short-term mass flow fluctuations on account of the inertia, since the metering rotor has a substantial own mass of some hundreds of kilograms, especially in a design resistant to pressure surges, so that the required changes in angular velocity for keeping the feed strength constant with strongly fluctuating mass flows, i.e. strong acceleration or deceleration of the metering rotor, are hardly possible on account of the mass inertia.

These plus/minus fluctuations can be partially compensated in the first-mentioned system for feeding and/or metering bulk goods, in the way of forming an average value, in that a collecting container supported on load cells is provided. However, such a compensating container increases the expense of construction and the demand on space.

SUMMARY OF THE INVENTION

In consequence the invention is based on the object of providing a method and an apparatus for continuous gravimetric metering and mass flow determination, especially of bulk goods, with which an improved metering accuracy is attained in a simple way, even with strongly fluctuating conveyer material feed.

One aspect of the invention involves an apparatus for continuous, gravimetric metering and mass flow determination of flowable materials. A metering device is configured to determine instantaneous mass flow at an anticipatory control point ahead of a delivery point at which flowable material is discharged. The discharge of the flowable material is controllable by altering a speed of rotation of the metering device. A metering controller is connected to the metering device and configured to detect an actual speed of rotation. Discharge at the delivery point is regulated in dependence on mass flow deviations at the metering device by variable location of the anticipatory control point.

Another aspect of the invention involves a method for continuous, gravimetric metering and mass flow determination of flowable materials. A metering device determines an instantaneous mass flow at an anticipatory control point ahead of a delivery point for the flowable material. The discharge of the flowable material is affected by altering a speed of rotation of the metering device. A distance of the anticipatory control point ahead of the delivery point is determined to match at least one of a current actual speed and a loading of the metering device.

By regulating the metering device and thus the discharge for regulating the feed strength at an anticipatory control point calculated from the current actual speed and in direct dependence on the instantaneous mass flow determined at the metering device, a highly accurate compensation for disturbing values results still before transfer of the bulk goods at the point of delivery or process system, so that a particularly high short-term metering accuracy is achieved. Regulation of the actual feed strength to the set-point value as adjusted is thus effected with practically no dead time, since it is determined accurately when or at what angle the mass deviation will arrive at the delivery point and this can be compensated for accordingly by increasing or reducing the conveyor speed.

This is particularly important in coal dust metering for achieving a constant burning process or in flue gas purification. This compensation for disturbing values in the metering ahead of transfer of the conveyed material into the chemical or thermal process thus facilitates a particularly high short-term metering accuracy in the manner of anticipatory regulation, wherein the use of a metering rotor in particular allows a highly accurate mass flow determination through a wide range of adjustment of the set-point feed strength.

Preferred embodiments are the subject matter of the dependent claims, wherein in particular the possibility of monitoring by measurement of the actually attained actual speed at a monitoring point and a following correction is especially advantageous, since residual regulation deviations can by avoided by this.

BRIEF DESCRIPTION OF THE DRAWINGS

An embodiment will be explained and described in more detail below with reference to the drawings, in which.

DETAILED DESCRIPTION OF THE INVENTION

Figure 1:
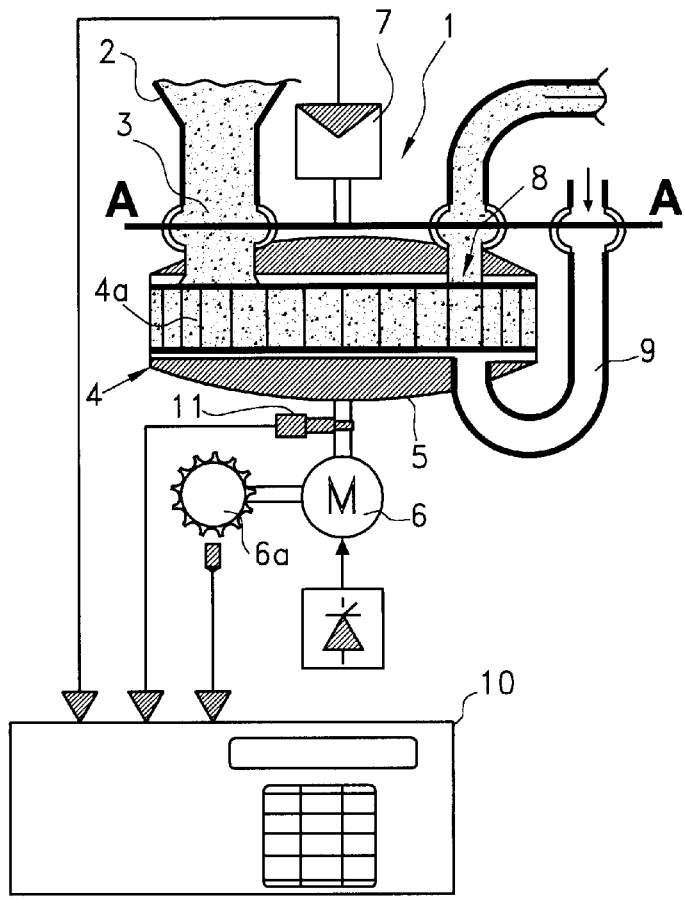
FIG. 1 is a sectional view through an apparatus for continuous gravimetric bulk goods metering with a metering rotor as the metering device.

An apparatus 1 for continuous gravimetric metering and mass flow determination is shown in FIG. 1, wherein the feed material, especially a free-flowing bulk material to be metered in accordance with an adjustable set-point feed strength, is fed out of a hopper or silo 2 by means of a feeder 3. The feed material passes to a metering device 4r which is arranged inside a housing 5 and defines therewith a measuring path over about 300° of circumference (cf. FIG. 2), up to a delivery point 8. The metering device 4 is preferably formed as a metering rotor 4a, as is described in more detail in DE 3 217 406 A1. This metering rotor 4a is mounted on a pivotal axis A—A running laterally from the housing 5 and is driven by a speed controlled electric motor 6 as a drive source. The housing 5 of the metering rotor 4a is supported for limited pivotal movement on a load cell 7. The supporting moment on the load cell 7 mounted spaced laterally from the pivotal axis A—A is directly proportional to the mass of the material stream transported through the measuring path of the metering rotor 4a from the feeder 3 to the delivery point 8.

A blow-out line 9 opens into the delivery point 8 at the lower end of the housing 5. The load cell 7, a speed of rotation sensor 11 provided on the rotor shaft and a tachogenerator 6a of the drive source 6 are connected to an electronic metering controller 10, which thus determines the instantaneous mass flow x by multiplication of the instantaneous loading B by the speed of rotation/angular velocity and places it in relation to the set-point feed strength W as adjusted, as well as controlling a setting value Y of the drive motor 6 of the metering rotor 4a, e.g. through a thyristor, in order to vary the speed of rotation or angular velocity and thus keep the adjusted feed strength constant. If there is a negative deviation of the loading B at the metering device (e.g. −0.2%), the angular velocity of the metering rotor 4a is raised by the corresponding value in order keep the feed strength x constant, accordingly by +0.2% in this case, as is known per se through the regulating path shown in a heavier line in FIG. 3.

What is important here is that, by the determination of the angular distance for the anticipatory control point P ahead of the delivery point 8 (cf. FIGS. 2 and 3), geometrically determined provisions are provided such that it can be accurately calculated by the metering controller 10 at what point in time the disturbing value (e.g. the deviation of −0.2%) will occur at the delivery point 8. Depending on the actual speed of the metering rotor 4a which is also measured, an accurate advance time interval can be determined having regard to the advance angle from the metering device 4 and the corresponding cell 4b of the metering rotor 4a and the speed of rotation/rpm, after which the disturbing value (negative deviation) occurs after determination at the load cell 7 at the delivery point 8, i.e. where the blow-out line 9 opens. The metering controller 10 can thus give the corresponding command, shortly in advance to take into account the inertia of the metering rotor 4a, to increase the speed by e.g. 0.2%. An anticipatory regulation of the actual feed strength is thus possible with this device in real-time.

Figure 2:
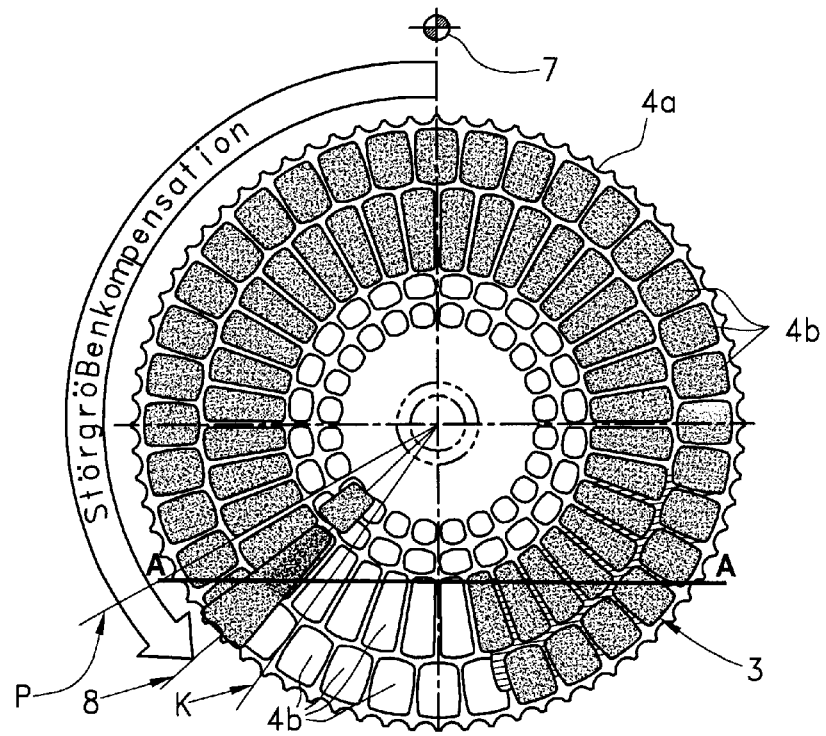
FIG. 2 is a schematic plan view according to FIG. 1.

A plan view of the device according to FIG. 1 is shown in FIG. 2, wherein the cellular formation of the metering rotor 4a in particular can be seen, likewise the arrangement of the delivery point 8 and of the anticipatory control point P ahead thereof in the direction of rotation and a following monitoring point K. In an advantageous design, in order largely to minimise the regulation deviations, the actual speed can be detected by the speed sensor 11 and be compared in a comparator 21 (cf. FIG. 3 upper control path) with the speed value controlled at the anticipatory control point P and be fed to an integrator 20 with a long time constant 20. If for example the control value Y provided at the anticipatory control point P to the drive motor 6 was not sufficient for the desired feed strength on account of the overall inertia, by advancing the anticipatory control point P (from here about 20° to about 25° ahead of the delivery point 8) the required interval of time for the acceleration/braking of the metering rotor 4a with timely attainment of the controlled speed at the delivery point is provided and thus the set mass flow W is adjusted to with the metering device 4. The anticipatory control point P should be as near as possible to the delivery point 8, so that drive means 6 which can accelerate/brake strongly are advantageous.

Figure 3A:
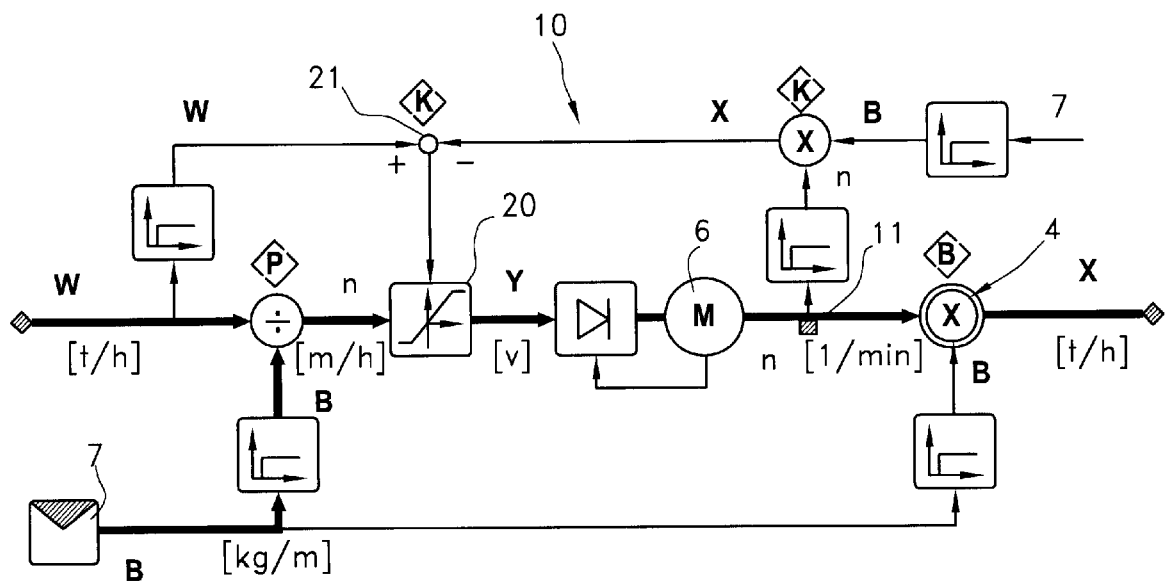
FIG. 3 is a block diagram of the preferred regulating circuit for the metering according to FIG. 1 and FIG. 2.
Figure 3B:
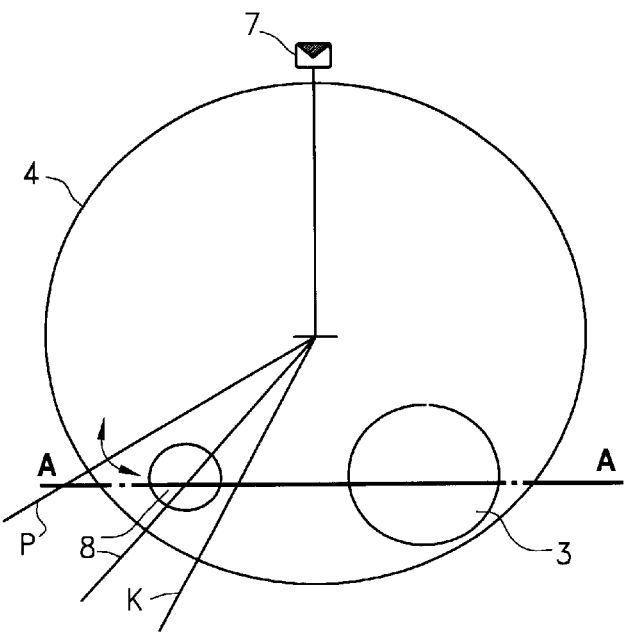

A regulating block diagram for the continuous gravimetric metering and mass flow determination at the sequential positions in the feed direction (shown in diamonds) of the anticipatory control point P, the delivery point 8 and the monitoring point K is shown in FIG. 3, wherein the components in FIG. 1 and FIG. 2 are connected to the metering controller 10, with otherwise like construction, which controls the discharge rate x from the housing 5 of the metering device 4 in dependence on the instantaneous mass flow (loading B) established by the metering device 4. Depending on the instantaneous loading B the beginning or start point of the speed regulation of the drive motor 6 can thus be varied, taking into account the current inertial moment, in order to maintain the set-point feed strength W. The fixed geometric parameters, such as own mass and circumference of the metering rotor 4a, angle between the centre of the delivery point 8 and the monitoring point K, are stored in the metering controller 10, so that it can be found accurately from a measured actual angular velocity when the loading B determined by the metering device 4 arrives at the delivery point 8 and thus suitable follow up regulation by accelerating/decelerating the feed speed can be undertaken.

Although the metering device has been described as a metering rotor 4a, the illustrated control and regulating method can also be used with a metering belt balance or a metering auger conveyor to enhance the short-term metering accuracy at the delivery or discharge point, since substantial inertial moments can also occur here.

What is claimed is:

1. A method for continuous, gravimetric metering and mass flow determination of flowable materials, comprising:
   determining with a metering device an instantaneous mass flow at an anticipatory control point located a first distance ahead of a delivery point for the flowable material;
   affecting discharge of the flowable material by altering a speed of rotation of the metering device; and
   varying the first distance of the anticipatory control point ahead of the delivery point depending on at least one of a current actual speed and a loading of the metering device.

2. The method according to claim 1, further comprising measuring the actual speed at the delivery point or shortly thereafter at a monitoring point.

3. The method according to claim 2, further comprising taking into account in one of subsequent speed control operations a deviation set at the anticipatory control point between the actual speed and measured at the monitoring pint.

4. The method according to claim 1, further comprising detecting and storing in a metering controller a deviation between the actual speed set at the anticipatory control point and that measured at the monitoring point, and placing it in relation to the set-point speed.

5. The method according to claim 1, wherein the metering device is a metering rotor.

6. An apparatus for continuous, gravimetric metering and mass flow determination of flowable materials, comprising
   a metering device configured to determine instantaneous mass flow at an anticipatory control point located a first distance ahead of a delivery point at which flowable material is discharged, the discharge of the flowable material being controllable by altering a speed of rotation of the metering device; and
   a metering controller connected to the metering device and configured to detect an actual speed of rotation, wherein discharge at the delivery point is regulated in dependence on mass flow deviations at the metering device by varying the first distance of the anticipatory control point.

7. The apparatus according to claim 6, wherein the metering device is a metering rotor.

8. The apparatus according to claim 7, wherein the drive means of the metering rotor comprises a speed rotation sensor for detecting the actual speed.

9. The apparatus according to claim 7, wherein the metering controller detects a mass and a current loading of the metering rotor.

10. The apparatus according to claim 6, wherein the metering controller comprises at least one integrating circuit, which detects a deviation possibly occurring at a monitoring point at or shortly after the delivery point and corrects the control value of the metering controller correspondingly.

11. The apparatus according to claim 10, further comprising a comparison module that alters a position of the anticipatory control point.

* * * * *

UNITED STATES PATENT AND TRADEMARK OFFICE
CERTIFICATE OF CORRECTION

PATENT NO.      : 6,435,039 B1                                                Page 1 of 1
DATED           : August 20, 2002
INVENTOR(S)     : Wolfschaffner et al.

It is certified that error appears in the above-identified patent and that said Letters Patent is hereby corrected as shown below:

<u>Title page,</u>
Item [12], please correct the name to -- Wolfschaffner et al. --.

Signed and Sealed this

Twenty-first Day of January, 2003

JAMES E. ROGAN
*Director of the United States Patent and Trademark Office*